United States Patent [19]
Hornung

[11] 3,875,485
[45] Apr. 1, 1975

[54] SPEED CONTROL SYSTEM FOR A-C MOTORS, WHICH SLOWS MOTOR DOWN WHEN IN OVERSPEED CONDITION AND STOPS MOTOR WHEN IN UNDERSPEED CONDITION

[75] Inventor: Friedrich Hornung, Stuttgart, Germany

[73] Assignee: Robert Bosch GmbH, Gerlingen-Schillerhohe, Germany

[22] Filed: Dec. 6, 1973

[21] Appl. No.: 422,267

[30] Foreign Application Priority Data
Mar. 10, 1973 Germany.......................... 2312127

[52] U.S. Cl................ 318/227, 318/331, 318/345
[51] Int. Cl........................ H02k 27/20, H02p 5/40
[58] Field of Search .......... 318/331, 332, 345, 313, 318/227

[56] References Cited
UNITED STATES PATENTS

| | | | |
|---|---|---|---|
| 3,249,807 | 5/1966 | Nuckolls | 318/313 |
| 3,412,305 | 11/1968 | Kanner | 318/332 |
| 3,441,823 | 4/1969 | Schlabach | 318/227 |
| 3,443,188 | 5/1969 | Mortimer | 318/227 |
| 3,470,436 | 9/1969 | Steele | 318/227 |
| 3,521,140 | 7/1970 | Kobayashi | 318/331 |
| 3,560,828 | 2/1971 | Kobayashi | 318/332 |
| 3,582,744 | 6/1971 | Coffey | 318/313 |
| 3,710,219 | 1/1973 | Takahashi | 318/331 |
| 3,783,361 | 1/1974 | Mason | 318/227 |

*Primary Examiner*—G. R. Simmons
*Assistant Examiner*—John J. Feldhaus
*Attorney, Agent, or Firm*—Flynn & Frishauf

[57] ABSTRACT

A bridge network has three resistance branches, the fourth branch being formed by the armature winding of the motor which, typically, is a series motor. Unbalance of the bridge is sensed and applied over a coupling element, for example an opto-electronic coupler, to a control circuit in series with the motor armature to controllably supply power to the motor, for example by intermittent application of current thereto.

12 Claims, 4 Drawing Figures

SPEED CONTROL SYSTEM FOR A-C MOTORS, WHICH SLOWS MOTOR DOWN WHEN IN OVERSPEED CONDITION AND STOPS MOTOR WHEN IN UNDERSPEED CONDITION

The present invention relates to a speed control system for use with an a-c motor, particularly for use with a series connected motor.

Many electronic circuits are known to control the speed of motors. The control characteristics depend to some extent on the complexity of the circuit, and hence the number of components being used.

It is an object of the present invention to provide a reliably operating speed control circuit for a-c motors, which permits regulation of speed over a substantial range, without utilizing many components.

SUBJECT MATTER OF THE PRESENT INVENTION

Briefly, the armature winding of the motor is formed as the branch of a bridge network, which is designed and adjusted to have such relative values of the bridge components that, if the motor speed deviates by a predetermined amount from a command speed, the bridge becomes unbalanced. Unbalance of the bridge is sensed, and converted into a control signal which is applied to a control network to control application of power to the motor, the control network being connected in series with the armature winding of the motor.

Effective and close control is obtained if transfer of information regarding unbalance of the bridge includes a transfer circuit and a signal transfer element, for example an opto-electronic coupler.

Loading of the motor within its speed controlled range does not greatly affect the speed of the motor as such; in other words, speed of the motor is held constant in spite of change in loading on the motor. Maximum torque, that is, maximum current accepted by the motor can be limited to a predetermined value. The circuit, therefore, permits limiting the current flow to the motor upon starting and, additionally, provides for compensation of voltage fluctuations, in increasing or decreasing direction from nominal voltage without affecting running speed, and particularly no-load speed of the motor.

The invention will be described by way of example with reference to the accompanying drawings, wherein.

Figure 1:
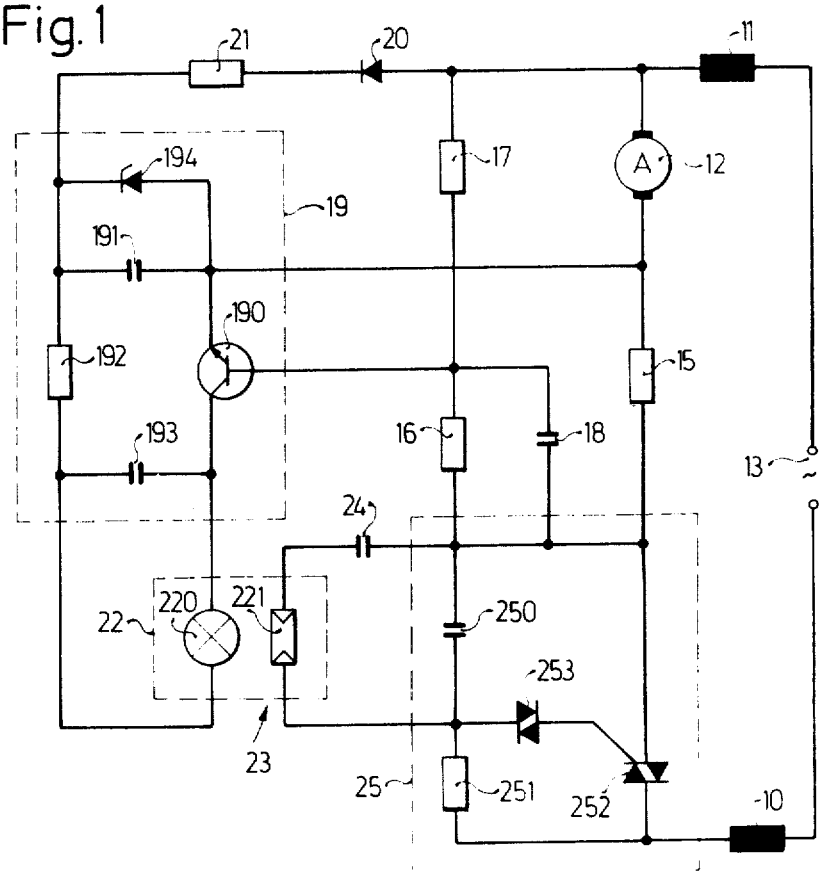
FIG. 1 is a schematic diagram of an embodiment of the present invention.

An a-c series motor having field windings 10, 11, and an armature winding 12 is supplied from an a-c source 13. A triac 252, and a resistor 15 are connected in series with armature 12. Resistor 15 forms one arm of a bridge. Armature 12 forms another arm of the same bridge. A second branch of the bridge is formed by two resistors 16, 17. Armature inductivity is compensated by a capacitor 18 in parallel to resistor 16; capacitor 18 also bypasses armature harmonics.

The junction J2 of resistors 16, 17 is connected to the base of a transistor 190, which forms an active element in a signal transfer and sensing circuit. The junction J1 between resistor 15 and armature 12 is connected to the emitter of transistor 190. The signal sensing circuit 190 further comprises a supply capacitor 191, a current limiting resistor 192, and a control capacitor 193 which is connected to the collector of the transistor 190. A Zener diode 194 is connected in parallel to the supply capacitor 191 to stabilize the voltage thereacross. The junction point between the armature 12 and field winding 11 is connected over a rectifier diode 20 and a supply resistor 21 to the junction of the current limiting resistor 192 and the supply capacitor 191, and hence to the cathode of the Zener diode 194. An opto-electronic coupler 22 forms the active element of a coupling circuit 23. Control capacitor 193 is connected in parallel with the light generating branch 220 of the opto-electronic coupler 22. The secondary of the transfer circuit 23 comprises a photo-resistor 221 which is connected over an ignition or triggering capacitor 24 to the triggering capacitor 250 of a triac 252. A resistor 251 is connected between the junction of capacitor 250 and the triac 253 on the one hand, and to the junction between field 10 and triac 252.

Figure 2:
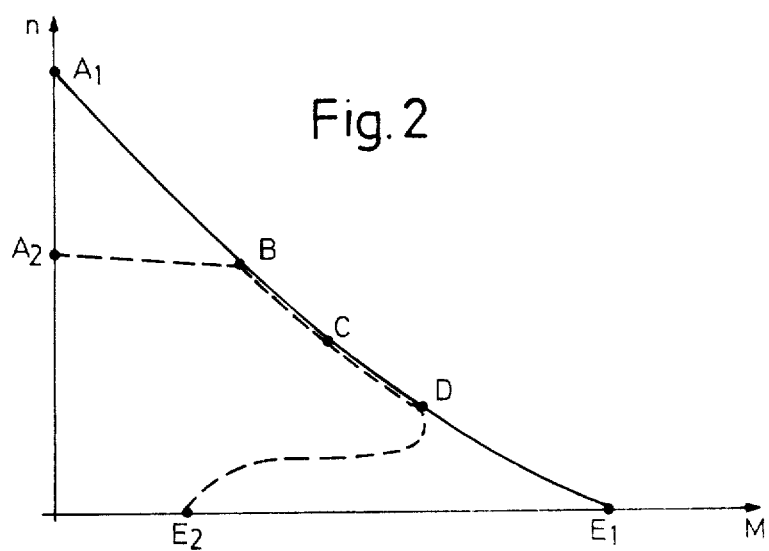
FIG. 2 is a speed-torque diagram (speed being shown at the ordinate) of a motor controlled in accordance with the system of the present invention and of an uncontrolled motor.

Operation, with reference to FIG. 2: The torque (abscissa) versus speed (ordinate) diagram of a series motor is shown in FIG. 2. The resistors of the bridge 15, 16, 17 and 12 are so adjusted with respect to each other that at an average or mean torque of the motor, the bridge is in balance and the cross connection, formed by junctions J1, J2 does not have a voltage appear thereacross. Upon application of a load to the motor, that is, upon increasing torque requirement M, speed n drops, as can be seen by the solid line of FIG. 2. This decreases the armature voltage and the voltage drop across resistor 15 increases. Let it be assumed that the average loading condition of the motor is defined by point C of FIG. 2. If this loading condition is shifted towards higher or lower speeds, the bridge is unbalanced and a bridge voltage will arise, which is applied across the base-emitter path of transistor 190. Upon increase or decrease of torque, as indicated by points D and B, respectively, the bridge voltage will reach a value which is above the base-emitter threshold of transistor 190, and transistor 190 will become conductive. The voltage across the armature 12 is rectified by rectifying diode 20 to charge the supply capacitor 191. Zener diode 194 stabilizes the capacitor voltage of the supply capacitor 191. The charging current is limited by the supply resistor 21. The transistor 190, cyclically conductive, charges the control capacitor 193 over the current limiting resistor 192 and over its collector-emitter path. The parameters which determine the charging current, the voltage across the supply capacitor 191, and the value of the current limiting resistor 192 are fixed. The charge on the control capacitor 193 thus only depends on time, that is, the amplitude of the bridge voltage. The capacitor voltage across capacitor 193 thus is an analog value representative of load on the motor in the regions beyond the points B and D in the graph of FIG. 2. The control capacitor 193 can discharge over the light generating branch 220 of the opto-electronic coupler 22. The ignition timing of the triac, which is in series with the motor, is determined by the value of resistor 251 and of the triggering capacitor 250. When the breakdown voltage of trigger diode 253 is exceeded, the trigger diode 253 becomes conductive which, in turn, renders triac 252 conductive. Photo-resistor 221, which changes its resistance in dependence on incident light from the light generating branch 220, connects the additional capacity of trigger capacitor 24 in parallel to the ignition capacitor 250, depending on the torque applied to the motor. The overall effective capacity, that is, the value of the capacitors 250 and 24, if connected, which is charged by the resistor 251 until the trigger voltage of trigger triac 253 is reached, thus changes and, hence, the ignition timing of triac 252 likewise changes. Region B to D of FIG. 2 is a range in which the bridge voltage is too small in order to render transistor 190 conductive. No light will be generated, since no light current will flow through branch 220 of the opto-electronic coupler 22. The ignition capacitor 250 is the only capacitor which is connected. Ignition capacitor 250 and resistor 251 are so relatively adjusted that a current flow of about 180° — electrical — is obtained, that is, the motor is connected practically to full line voltage. If the region B to D (FIG. 2) is exceeded in the direction towards a smaller torque, that is, if the motor load is removed, the bridge 15, 16, 17 and armature 12 are highly unbalanced, transistor 190 becomes conductive and the resultant current through light branch 220 of opto-electronic unit 22 causes resistor 221 to assume a low value, so that the additional ignition capacitor is connected. The additional ignition capacitor 24 becomes more and more effective as the motor speeds up, thus decreasing the phase angle of current flow more and more. This limits the speed of the motor. The controlled region, due to the circuit, is seen in the range $A_2$ - B. The uncontrolled operating curve is seen in the range $A_1$ - B.

Upon increase in torque beyond point D, that is, if the motor is loaded in excess of its design value, current through the armature will increase substantially so that the relative voltage drops shift to an increase in voltage drop across resistor 15 and a decrease in voltage drop across armature 12. This, again, unbalances the bridge. The decreased effective motor voltage limits further increase of torque. A limit to a maximum torque will be determined, given by point D (or just beyond) of the diagram of FIG. 2. The range D to $E_2$ in the diagram of FIG. 2 results in an astable operation, such as intermittent operation of an asynchronous motor. This characteristic is determined by concurrent decrease of armature voltage, upon decrease of speed N, in the region D –$E_2$, and additional decrease of phase angle of current supply from circuit 25. The phase angle of current supply influences the unbalance of the bridge similarly to unbalance of the bridge at high speed operation although, under excess load, the decreased phase angle of operation is already a result of the unbalanced bridge. This feedback effect in the control cycle is cumulative, so that decrease of the phase angle of current flow causes an immediate further unbalance of the bridge which, in turn, causes a further decrease in torque M.

The starting torque of the motor is between the ranges E2 and D, and is substantially less than the starting torque of a non-controlled motor (point E1). The controller thus acts, additionally, as a starting current limiting circuit.

The controller has the further advantage that voltage fluctuations of the supply network are rendered essentially ineffective with respect to the no-load speed of the motor, that is, point $A_2$. Let it be assumed that operating voltage increases, so that the supply voltage 13 increases. The voltage across armature 12 will increase, which causes an unbalance of the bridge, the bridge voltage increases and, as above explained, the phase angle of supply of current will become less. The increase in effective armature voltage, due to the increased value of supply voltage is compensated by the decreased phase angle of current supply, as determined by the cyclical firing of triac 252. The speed n remains essentially constant.

Figure 3:
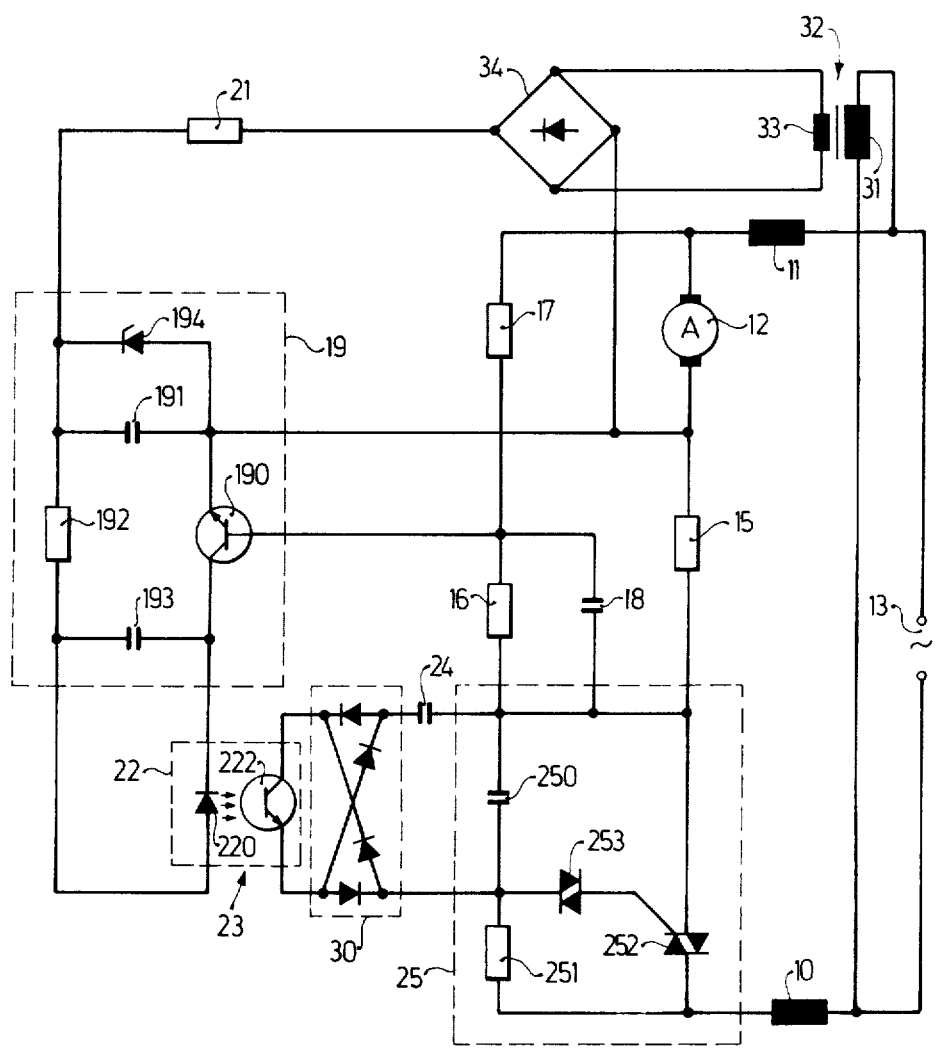
FIG. 3 is a schematic circuit diagram of another embodiment of the invention.

Embodiment of FIG. 3: Essentially, the circuit corresponds to the embodiment of FIG. 1. A light emitting diode (LED) 220' in the opto-electronic coupler 221 is used, which requires only little current and is essentially immune to vibration and shock, in contrast to an incandescent lamp. The secondary portion of the opto-electronic coupler is formed by a photo-transistor 222. Photo-transistor 222 is a polarized element; capacitor 24 must, however, be charged with voltages of changing polarity, and therefore a rectifier bridge circuit 30 is necessary connected between the photo-transistor 222 of coupling element 23'. A transformer 32 is provided, having its primary 31 connected across the line voltage 13. The secondary 33 is connected over a bridge rectifier 34 and functions as a voltage supply source for the sensing circuit 19.

The circuit of FIG. 3 has the advantage with respect to the circuit of FIG. 1 that a constant voltage is available to supply capacitor 191. In the embodiment of FIG. 1, the voltage supply of capacitor 191 depends on the armature voltage 12, and hence on the loading of the motor. The operation, in all essential respects is the same, and elements which are similar to those of FIG. 1 have not been described again and have been given the same reference numerals.

Figure 4:
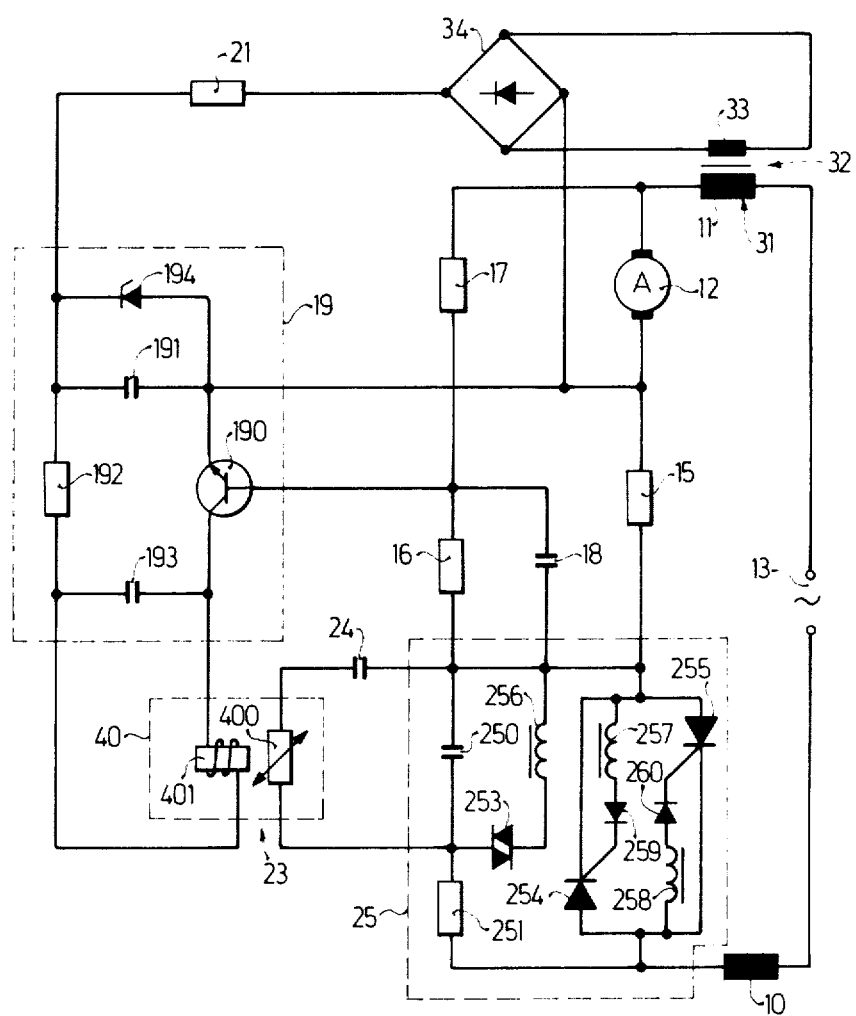
FIG. 4 is a schematic circuit diagram of yet a third embodiment of the present invention.

Embodiment of FIG. 4; Construction and operation are similar to the previously described embodiments. The difference is the transfer element 23" which utilizes a magnet field dependent coupler 40. In the primary side of coupler 40, a solenoid coil 401 is provided; at the secondary, a magnetic field dependent resistor 402 is used. Magnet dependent couplers are also available with semiconductor components, known as Madistors. An additional difference is the use of one of the field windings 11 of the motor as a primary 31" of transformer 32". This arrangement is cheaper and simpler than the arrangement in accordance with FIG. 3 and further provides galvanic separation of the motor current from the sensing and transfer circuit 19. Further, two anti-parallel connected thyristors 254, 255 are used instead of triac 252. This arrangement is desirable when the motor power exceeds the power handling capability of commercially available triacs. Thyristors, further, have a higher breakdown voltage and current rise time than triacs. Using anti-parallel thyristors 254, 255 in the control circuit 25" thus extends the capability of the circuit beyond that of commercial triac components. The thyristors 254, 255 are fired by a firing transformer having windings 256, 257, 258; the primary 256 is connected with serially connected triggering triac to the ignition capacitor 250. Control electrodes of the triacs have a protective diode 259, 260 connected in series with the secondary of the respective transformer windings 257, 258. The other end of the secondary winding 257, 258 is connected to the cathode of the respective thyristor 254, 255. This connection of the thyristors is an arrangement which is known per se. Instead of triac 253, a pair of anti-parallel connected diodes may be used.

Various changes and modifications may be made in accordance with the inventive concept and features of the invention described in connection with any one of the embodiments may be used with any of the other embodiments.

I claim:

1. Control system for a-c electric motors in which the motor is designed for operation at a predetermined a-c supply voltage derived from an a-c source (13), the motor having an armature winding (12), said system comprising a bridge network which includes three impedance arms (15, 16, 17) and the armature winding (12) as the fourth arm thereof, the impedance branches being dimensioned with respect to the armature winding and the supply voltage such that the bridge will be in balance at a predetermined supply voltage and at a predetermined command speed and provide a diagonal sensing voltage of effectively zero;

a phase angle control circuit (25) in series with the motor armature (12) controlling supply of power to the motor, the phase angle control circuit including at least one semiconductor switch (252; 254, 255), a timing capacitor (250) connected to the semiconductor switch and determining the firing angle thereof, a further capacitor (24) and a controllable variable resistor (221, 222, 400);

and a sensing circuit (19) sensing unbalance of the bridge which includes a threshold switch (190, 191, 194) having an upper threshold level (FIG. 2: B) and a lower threshold level (FIG. 2: D), the threshold switch being controlled by said bridge circuit and becoming conductive if either the upper, or lower threshold level thereof is passed upon unbalance of the bridge, the circuit being connected to and controlling said controllable variable resistor (221, 222, 400) to change resistance and thus decrease the timing constant of the phase angle control circuit and decrease the phase angle of firing from said angle as determined by said timing capacitor to thereby limit supply of power to the motor upon a. change in supply voltage from the predetermined value in excess of the range which causes the threshold level of the threshold switch circuit to be exceeded upon unbalance of the bridge;

b. change in command speed in excess of a predetermined value;

c. change in command speed below a predetermined value.

2. System according to claim 1, wherein the threshold switch circuit includes a capacitor (193) and connected to be charged in dependence on unbalance of the bridge.

3. System according to claim 1, wherein the sensing means comprises a signal sensing circuit (19) and a coupling circuit (23, 23', 23'') connecting the sensing circuit to the controllable means.

4. System according to claim 1, wherein the impedance arms (15, 16, 17) comprise resistors, the fourth arm being formed by the armature winding (12) of the motor.

5. System according to claim 2, wherein the threshold switch includes a transistor (190).

6. System according to claim 1, further comprising rectifier means (20) connected to the armature (12) and providing a voltage representative of armature voltage to said threshold switch circuit as a supply voltage therefor.

7. System according to claim 2, further comprising a supply transformer (33) and a rectifier (34) connected to the threshold switch to form a supply circuit therefor to charge said capacitor.

8. System according to claim 7, wherein the motor is a series motor and has a field winding, said field winding forming the primary (31'') of the supply transformer (32'').

9. System according to claim 2, wherein a coupling circuit (22) is provided, connecting the sensing circuit (19) to the controllable resistor (221, 222, 400) said coupling circuit forming a discharge path for the control capacitor (193) and forming an averaging circuit.

10. System according to claim 9, wherein the coupling circuit is a four-terminal circuit having one branch connected across the capacitor (193) and the other branch connected in circuit with said controllable resistor and having a-c passing therethrough.

11. System according to claim 10, wherein the coupling circuit includes an opto-electronic coupler (22).

12. System according to claim 10, wherein the coupling circuit includes a magnetic field coupler (40).

* * * * *